(12) United States Patent
Kang et al.

(10) Patent No.: US 10,497,169 B2
(45) Date of Patent: Dec. 3, 2019

(54) METHOD AND APPARATUS FOR RENDERING IMAGE

(71) Applicant: SAMSUNG ELECTRONICS CO., LTD, Suwon-si (KR)

(72) Inventors: Byong Min Kang, Yongin-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/921,186

(22) Filed: Mar. 14, 2018

(65) Prior Publication Data

US 2019/0096121 A1 Mar. 28, 2019

(30) Foreign Application Priority Data

Sep. 25, 2017 (KR) .................. 10-2017-0123202

(51) Int. Cl.
*G06T 15/20* (2011.01)
*G09G 5/14* (2006.01)
*G06T 11/60* (2006.01)
*G02B 27/01* (2006.01)
*G02B 27/22* (2018.01)
(Continued)

(52) U.S. Cl.
CPC .......... *G06T 15/20* (2013.01); *G02B 27/0101* (2013.01); *G02B 27/2214* (2013.01); *G06T 11/60* (2013.01); *G09G 5/14* (2013.01); *H04N 13/302* (2018.05); *H04N 13/356* (2018.05); *H04N 13/361* (2018.05); *H04N 13/383* (2018.05); *G02B 2027/014* (2013.01);
(Continued)

(58) Field of Classification Search
CPC ....... G06T 15/20; G06T 11/60; H04N 13/383; H04N 13/302; H04N 13/361; H04N 13/356; G02B 27/0101; G02B 27/2214; G02B 2027/0134; G02B 2027/014; G09G 5/14; G09G 2354/00; G09G 2380/10
See application file for complete search history.

(56) References Cited

U.S. PATENT DOCUMENTS 5,774,262 A 6/1998 Schwerdtner et al.
2010/0123737 A1* 5/2010 Williamson ....... G01C 21/3647
345/672
(Continued)

FOREIGN PATENT DOCUMENTS

EP 2 914 002 A1 9/2015
EP 3 031 655 A1 6/2016
(Continued)

OTHER PUBLICATIONS

Communication dated Nov. 27, 2018, issued by the European Patent Office in counterpart European Application No. 18179748.1.

*Primary Examiner* — Chong Wu
(74) *Attorney, Agent, or Firm* — Sughrue Mion, PLLC

(57) ABSTRACT

An image rendering method and apparatus are provided. The image rendering apparatus may determine which one of a two-dimensional (2D) display area that displays a 2D image and a three-dimensional (3D) display area that displays a 3D image includes a current pixel, may perform a 2D rendering operation at a position of the current pixel when the current pixel is included in the 2D display area, and may perform a 3D rendering operation at a position of the current pixel when the current pixel is included in the 3D display area.

20 Claims, 11 Drawing Sheets

(51) Int. Cl.
  *H04N 13/356*  (2018.01)
  *H04N 13/361*  (2018.01)
  *H04N 13/383*  (2018.01)
  *H04N 13/302*  (2018.01)

(52) U.S. Cl.
  CPC . *G02B 2027/0134* (2013.01); *G09G 2354/00* (2013.01); *G09G 2380/10* (2013.01)

(56) References Cited

U.S. PATENT DOCUMENTS

| | | | |
|---|---|---|---|
| 2011/0316881 A1 | 12/2011 | Yoshifuji et al. | |
| 2012/0223941 A1 | 9/2012 | Sekine et al. | |
| 2016/0155267 A1* | 6/2016 | Bean | G02B 27/01 345/633 |

FOREIGN PATENT DOCUMENTS

| | | |
|---|---|---|
| JP | 4696248 B2 | 6/2011 |
| JP | 2014-222848 A | 11/2014 |
| JP | 5883723 B2 | 3/2016 |
| KR | 10-1314601 B1 | 10/2013 |
| KR | 10-2015-0093353 A | 8/2015 |
| KR | 10-2016-0059783 A | 5/2016 |
| WO | 2010/095074 A1 | 8/2010 |

* cited by examiner

METHOD AND APPARATUS FOR RENDERING IMAGE

CROSS-REFERENCE TO RELATED APPLICATION

This application claims priority from Korean Patent Application No. 10-2017-0123202, filed on Sep. 25, 2017 in the Korean Intellectual Property Office, the disclosure of which is incorporated herein by reference in its entirety.

BACKGROUND

1. Field

Methods and apparatuses consistent with exemplary embodiments relate to a method and apparatus for rendering an image.

2. Description of the Related Art

A viewer may perceive a stereoscopic effect of a three-dimensional (3D) image only when respective images shown to the two eyes of the viewer are different. A scheme of presenting different images to right and left eyes of a user may include, for example, a stereoscopic scheme and an autostereoscopic scheme. In the stereoscopic scheme, filtering of a desired image may be performed by using a polarized light division, a time division or a wavelength division in which a wavelength of a primary color is filtered. In the autostereoscopic scheme, images may be made to be visible for each viewpoint of a space by using a 3D optical device, such as, for example, a parallax barrier, a lenticular lens, or a directional backlight unit (BLU).

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a method of rendering an image to be displayed on a display device. The method includes determining which one from among a two-dimensional (2D) display area and a three-dimensional (3D) display area includes a current pixel, the 2D display area displaying a 2D image and the 3D display area displaying a 3D image, performing a 2D rendering operation at a position of the current pixel when the current pixel is included in the 2D display area, and performing a 3D rendering operation at a position of the current pixel when the current pixel is included in the 3D display area.

Each of the 2D display area and the 3D display area may be included in a single screen.

The 2D display area may surround the 3D display area.

The method may further include performing the 2D rendering operation or the 3D rendering operation on each of a plurality of pixels, and generating a result image in which the 2D image is combined with the 3D image.

The 2D display area may display at least one from among a text and a guidance indication.

The 2D display area may display the at least one from among the text and the guidance indication to provide operating information that relates to a vehicle.

The 3D display area may display an image of a 3D object.

The 3D display area may display the image of the 3D object to guide a traveling path of a vehicle.

A plurality of viewing zones to display the image of the 3D object may be generated in the 3D display area by using at least one from among a parallax barrier and a lenticular lens.

The display device may be a head-up display (HUD) device.

A non-transitory computer-readable storage medium may store instructions that, when executed by a processor, cause the processor to perform the method.

According to another aspect of an exemplary embodiment, there is provided an image rendering apparatus that includes at least one processor and a display panel including a 2D display area that displays a 2D image and a 3D display area that displays a 3D image. The processor is configured to perform at least one from among a 2D rendering operation and a 3D rendering operation on each of a plurality of pixels that are to be output using the display panel, and to generate a result image in which the 2D image is combined with the 3D image, and the display panel is configured to display the result image.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
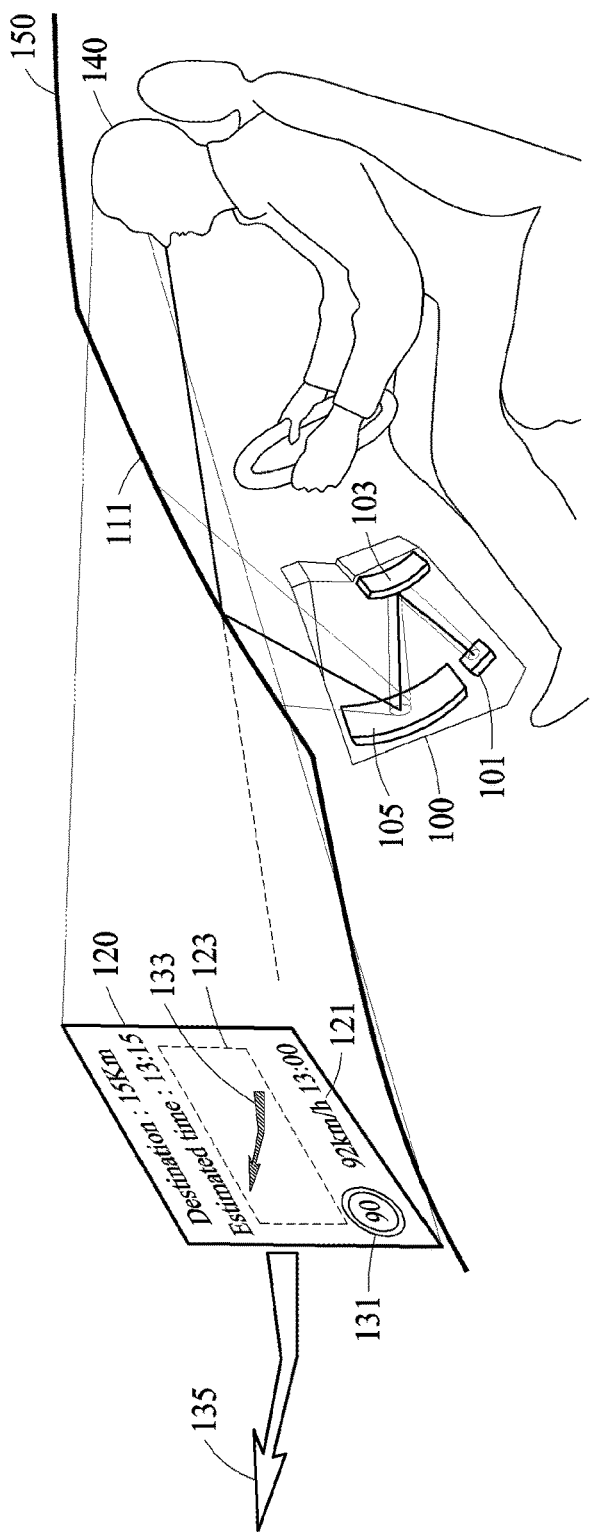
FIG. 1 is a diagram illustrating an operation of an image rendering apparatus applied to a head-up display (HUD) device, according to an exemplary embodiment.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms such as "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right, according to the concept of the present disclosure.

It will be understood that when a component is referred to as being "connected to" another component, the component may be directly connected or coupled to the other component, or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, exemplary embodiments will be described in detail with reference to the accompanying drawings, and like reference numerals in the drawings refer to like elements throughout.

FIG. 1 is a diagram illustrating an operation of an image rendering apparatus 100 applied to a head-up display (HUD) device, according to an exemplary embodiment.

The image rendering apparatus 100 may render an image and may provide the rendered image to a user. For example, the image rendering apparatus 100 may perform both two-dimensional (2D) rendering operations and three-dimensional (3D) rendering operations. The image rendering apparatus 100 may output both a 2D image and a 3D image on a single screen as a result of the 2D rendering and 3D rendering operations. The image rendering apparatus 100 may include a display that includes both a 2D display area to display a 2D image and a 3D display area to display a 3D image, and may output the 2D image using the 2D display area and may output the 3D image using the 3D display area.

The image rendering apparatus 100 may be applied to applications capable of providing both a 2D image and a 3D image. In the above applications, the image rendering apparatus 100 may provide image content in which the 2D image and the 3D image are mixed and/or combined. In an example, referring to FIG. 1, the image rendering apparatus 100 may be used to display, as a 3D image, a route guidance indicator in a form of an arrow on the HUD device, and display, as a 2D image, operating information (for example, a remaining distance from a current location to a destination, and/or an estimated time to reach the destination) in a form of text. In another example, the image rendering apparatus 100 may be used in an image system configured to mix and provide a 2D image and a 3D image, for example, to provide image content as a 3D image and provide a caption as a 2D image. In still another example, the image rendering apparatus 100 may be used in a field of an augmented reality (AR). The image rendering apparatus 100 may output, as a 3D image, content that may be more effective to be displayed in 3D, and may output, as a 2D image, content for which accurately and intelligibly displaying of information is important.

Referring to FIG. 1, the image rendering apparatus 100 applied to the HUD device may be installed in a vehicle 150, and may provide a driver 140 with a result image 120 in which a 2D image 121 and a 3D image 123 are combined. The result image 120 may be obtained by merging the 2D image and the 3D image through rendering, and may include the 2D image 121 and the 3D image 123. The 2D image 121 and the 3D image 123 may be arranged using any of various schemes in any of various forms. For example, as shown in FIG. 1, the 3D image 123 may be surrounded by the 2D image 121, however, this is merely an example and an arrangement scheme/form is not limited thereto. The 2D image 121 and the 3D image 123 may be arranged in any of various forms.

The image rendering apparatus 100 outputs, as the 2D image 121, content such as text that requires a high resolution and a high operation speed. For example, operating information 131 of the vehicle 150 may be displayed as the 2D image 121. Displaying of the operating information 131 as 2D text may be more suitable than displaying of the operating information 131 as a 3D image. The operating information 131 may include, for example, a speed limit of 90 km/h, a current speed of 92 km/h, a current time of 13:00, an expected arrival time of 13:15, and a remaining distance to a destination of 15 km.

Content requiring a reality and a stereoscopic effect may be displayed as the 3D image 123. For example, a route guidance indicator 133 that may be more effectively displayed in 3D to the driver 140 by matching a forward road condition may be displayed as the 3D image 123. The route guidance indicator 133 included in the 3D image 123 may be viewed in 3D as a guidance indication 135 which is pictorially matched to a road from a viewpoint of the driver 140, and accordingly the driver 140 may feel a relatively high sensation of reality using the route guidance indicator 133 in a 3D form.

In an example, the image rendering apparatus 100 may track eye positions of the driver 140 and may perform a 3D rendering operation based on the tracked eye positions, in order to enable a left viewpoint image and a right viewpoint image to be accurately shown at the eye positions. As shown in FIG. 1, a camera (not shown) for viewpoint tracking may be installed on a dashboard or a rear-view mirror of a vehicle, and may acquire an image that represents the two eyes of the driver 140. The image rendering apparatus 100 may receive, from the camera, an image or a moving image acquired by the camera, and may detect the eye positions of the driver 140 from the received image using a feature point extraction scheme or a template matching scheme. The image rendering apparatus 100 may determine, based on the detected eye positions, whether to assign a pixel value of the left viewpoint image or a pixel value of the right viewpoint image to each of a plurality of pixels of a 3D rendering image. For example, when a ray direction of a display pixel included in the 3D display area is closer to a left eye than a right eye, the pixel value of the left viewpoint image may be assigned to the display pixel. When the ray direction is closer to the right eye than the left eye, the pixel value of the right viewpoint image may be assigned to the display pixel. When the above process is performed on all display pixels, a 3D rendering image based on the eye positions of the driver 140 may be generated. The ray direction may be determined by a structural feature of a 3D optical device, for example, a lenticular lens and/or a parallax barrier included in the 3D display area.

Referring to FIG. 1, the image rendering apparatus 100 applied to the HUD device includes a display panel 101 and at least one reflection mirror, for example, reflection mirrors 103 and 105. The image rendering apparatus 100 may provide the driver 140 with the result image 120. The display panel 101 may output the result image 120 to the reflection mirror 103, and the reflection mirror 103 may enable the result image 120 to be provided to the driver 140 via the reflection mirror 105.

The image rendering apparatus 100 may display operating information on a windshield 111 of the vehicle 150, and accordingly the driver 140 may be provided with the operating information without a need to move eyes during driving. Thus, the image rendering apparatus 100 may provide the driver 140 with a greater convenience and reduce a risk of accidents.

A screen of the display panel 101 may include both the 2D display area and the 3D display area. The 2D display area and the 3D display area may be arranged in any of various locations. For example, the 2D display area may surround the 3D display area or may be located adjacent to the 3D display area on one or more sides, i.e., on an upper side, a lower side, a left side or a right side of the 3D display area. However, the above arrangements are merely examples, and an arrangement of the 2D display area and the 3D display area is not limited thereto.

To display a 3D image, the 3D display area may use a difference in viewpoints between an image that is perceived by the right eye of the driver 140 and an image that is perceived by the left eye of the driver 140. The 3D display area may be implemented by a stereoscopic 3D display or an autostereoscopic 3D display. In the autostereoscopic 3D display, a 3D optical device for isolation of viewpoints may be used. For example, the 3D display area may include a 3D optical device, for example, a lenticular lens and/or a parallax barrier, which is configured to output images in different viewpoint directions.

For example, the 3D display area may display a left viewpoint image in a 3D image to be viewed with the left eye of the driver 140, and may display a right viewpoint image to be viewed with the right eye of the driver 140, so that the driver 140 may feel a stereoscopic effect of content. In this example, due to an incomplete isolation of the left viewpoint image with respect to the right viewpoint image, a crosstalk phenomenon to reduce a quality of the 3D image may occur. The crosstalk phenomenon may be a phenomenon in which a portion of a left viewpoint image is shown to a right eye or a portion of a right viewpoint image is shown to a left eye, because the left viewpoint image and the right viewpoint image are not completely isolated from each other. When a viewpoint isolation is not properly performed, the crosstalk phenomenon may occur, which may cause the driver 140 to feel dizziness.

When a crosstalk phenomenon occurs in content displayed as text, unlike a route guidance indicator that is pictorially matched to an actual driving road and displayed in a form of an arrow, the driver 140 may feel a great inconvenience, which may lead to an increase in a risk of accidents. Thus, content such as text that is more suitable to be represented in 2D rather than 3D may desirably be displayed in 2D, instead of forming an entire display area as a 3D display area.

The image rendering apparatus 100 may provide content such as text for which conveying of an informational meaning is important, as a 2D image through 2D rendering, and thus it is possible to prevent a crosstalk phenomenon from occurring when text information is provided. Because the same 2D image is provided to a left eye and a right eye, unlike a 3D image, a crosstalk phenomenon is much less likely to occur. Further, because the 2D rendering operation is performed at a higher operational speed than that of 3D rendering, content for which conveying of an informational meaning is important may be more quickly processed via the 2D rendering operation.

As described above, the image rendering apparatus 100 may provide, as a 3D image, content for which a reality and a stereoscopic effect are important and provide, as a 2D image, content for which a conveyance of informational meaning and accuracy are important, through a display area provided on a panel including the 2D display area and the 3D display area. Thus, the image rendering apparatus 100 may accurately and quickly provide text information without a crosstalk phenomenon in which a crosstalk phenomenon does not occur, while providing a sensation of reality of a 3D image to the driver 140.

Although the image rendering apparatus 100 is applied to the HUD as shown in FIG. 1, the HUD is merely an example. Accordingly, the image rendering apparatus 100 may be applicable to other display devices. For example, the image rendering apparatus 100 may be applied to a projector mounted on a ceiling of the vehicle 150. Further, the image rendering apparatus 100 may be applied to any or all display devices that are capable of displaying both a 2D image and a 3D image.

Figure 2:
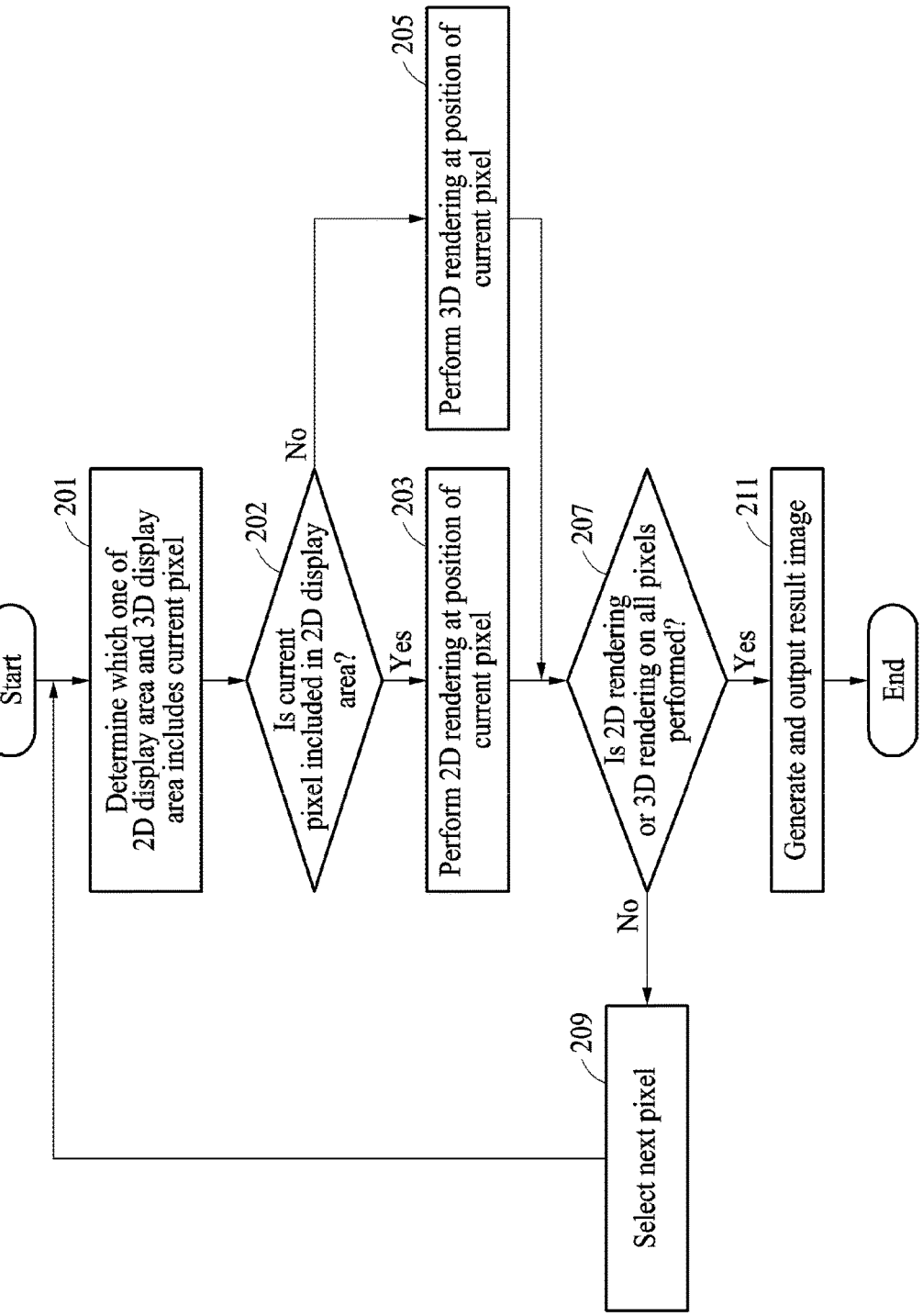
FIG. 2 is a flowchart illustrating an image rendering method, according to an exemplary embodiment.

FIG. 2 is a flowchart illustrating an image rendering method, according to an exemplary embodiment.

Referring to FIG. 2, in operation 201, an image rendering apparatus may determine which one of a 2D display area and a 3D display area includes a current pixel. The 2D display area may display a 2D image, and the 3D display area may display a 3D image. The 2D display area and the 3D display area may be included in a single screen. The 2D display area may be located so as to surround the 3D display area. Further, a lenticular lens and/or a parallax barrier corresponding to a size of the 3D display area may be located in the 3D display area. A display panel may include a plurality of pixels, and the image rendering apparatus may sequentially or in parallel perform a rendering operation for each of the pixels.

In operation 202, the image rendering apparatus may determine whether the current pixel is included in the 2D display area.

An image output through a pixel may be a 2D image or a 3D image, which may be determined based on whether the pixel is included in the 2D display area or the 3D display area. When the current pixel is included in the 2D display area, the image rendering apparatus may perform a 2D rendering operation at a position of the current pixel in operation 203. The image rendering apparatus may search for a pixel value corresponding to the current pixel from a 2D input image, and may assign the pixel value to the current pixel in the 2D display area. For example, the 2D display area may display text and/or a guidance indication.

When the current pixel is included in the 3D display area, the image rendering apparatus may perform a 3D rendering operation at a position of the current pixel in operation 205. The image rendering apparatus may determine a pixel value that is to be assigned to the current pixel, based on a left viewpoint image and a right viewpoint image, and may assign the pixel value to the current pixel in the 3D display area. The 3D display area may display an image of a 3D object. For example, the 3D display area may display an image of a 3D object to display a route guidance indicator that relates to a vehicle. The image rendering apparatus may separately provide the left viewpoint image and the right viewpoint image using a 3D optical device, for example, a lenticular lens and/or a parallax barrier. A plurality of viewing zones to display the image of the 3D object may be generated in the 3D display area using the 3D optical device.

When operation 203 or 205 is performed, the image rendering apparatus may determine whether 2D rendering or 3D rendering on all pixels has been performed in operation 207. When the 2D rendering or 3D rendering on all the pixels has not yet been performed, the image rendering apparatus may select a next pixel in operation 209 and may perform operations 201, 202, 203 or 205, and 207 on the next pixel.

When the 2D rendering or 3D rendering on each of the pixels has been performed, the image rendering apparatus may generate a result image in which the 2D image and the 3D image are combined, and may output the result image in operation 211.

Figure 3:
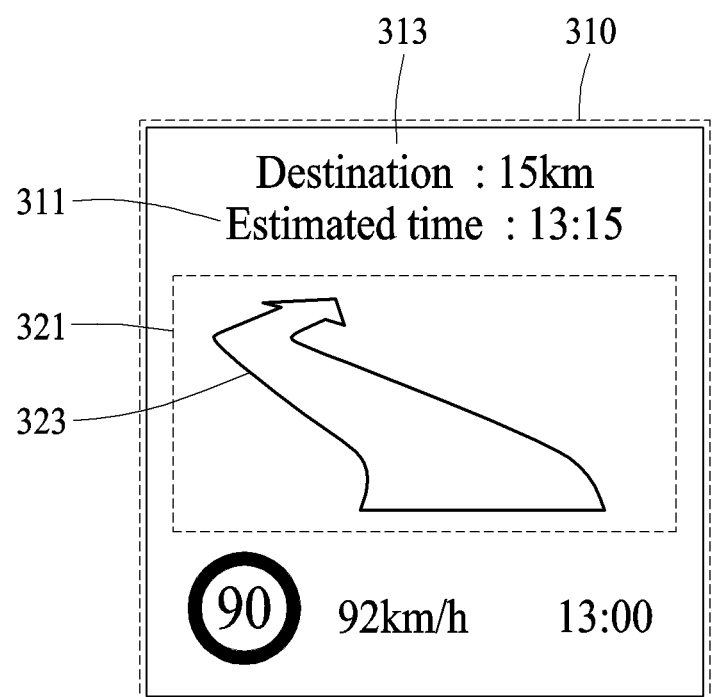
FIG. 3 is a diagram illustrating an example of a screen that includes a two-dimensional (2D) display area and a three-dimensional (3D) display area, according to an exemplary embodiment.

FIG. 3 is a diagram illustrating an example of a screen that includes a 2D display area and a 3D display area, according to an exemplary embodiment.

Referring to FIG. 3, a screen 310 of a display device may include a 2D display area 311 that displays a 2D image, and a 3D display area 321 that displays a 3D image. In a result image displayed on the screen 310, a route guidance indicator 323 may be displayed in a form of an arrow in the 3D display area 321, and operating information 313, for example, a speed limit, a current time, an estimated arrival time and a distance to a destination, may be displayed in the 2D display area 311. An image rendering apparatus may display text and/or a guidance indication to provide operating information that relates to a vehicle using the 2D display area 311, and may display an image of a 3D object to guide a traveling route of the vehicle using the 3D display area 321.

Figure 4:
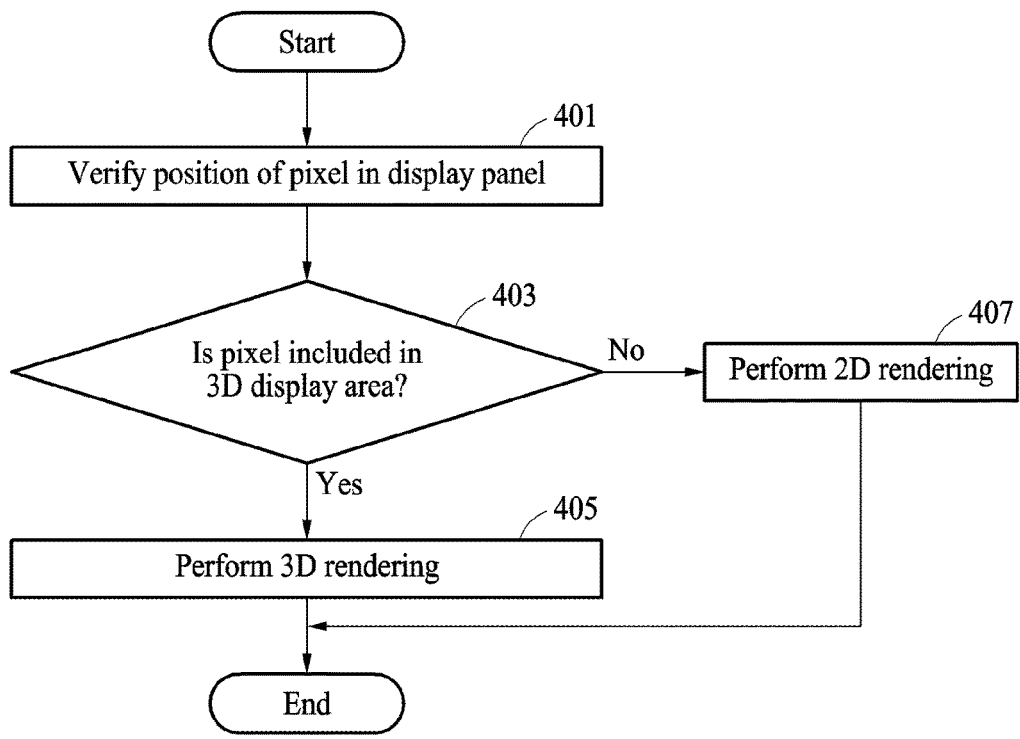
FIG. 4 is a flowchart illustrating an example of an image rendering method, according to an exemplary embodiment.

FIG. 4 is a flowchart illustrating an example of an image rendering method, according to an exemplary embodiment.

Referring to FIG. 4, in operation 401, an image rendering apparatus may verify a position of a pixel in a display panel at which a rendering operation is to be performed. The position of the pixel in the display panel may be represented by 2D coordinates, for example, D(x, y).

In operation 403, the image rendering apparatus may determine whether the pixel at D(x, y) is included in a 3D display area that displays a 3D image. For example, when the 3D display area is assumed to have a rectangular shape, a range of the 3D display area may be defined by $O_{left}$, $O_{right}$, $O_{top}$ and $O_{bottom}$. In this example, $O_{left}$ denotes an x coordinate of a left boundary of the 3D image display area, $O_{right}$ denotes an x coordinate of a right boundary of the 3D image display area, $O_{top}$ denotes a y coordinate of a top boundary of the 3D image display area and $O_{bottom}$ denotes a y coordinate of a bottom boundary of the 3D image display area.

The image rendering apparatus may determine whether an x coordinate of the pixel satisfies a condition of "$x > O_{left}$ and $x < O_{right}$" and a y coordinate of the pixel satisfies a condition of "$y < O_{top}$ and $y > O_{bottom}$." When the conditions are determined to be satisfied, the pixel may be determined to be in the 3D display area. When one of the conditions is not satisfied, the pixel may be determined to be in a 2D display area that displays a 2D image.

When the pixel is determined to be included in the 3D display area in operation 403, the image rendering apparatus may perform a 3D rendering operation at the position of the pixel in operation 405. The image rendering apparatus may perform the 3D rendering operation based on a plurality of viewpoint images and may determine a pixel value that is to be assigned to the pixel.

When the pixel is determined to be included in the 2D display area in operation 403, the image rendering apparatus may perform a 2D rendering operation at the position of the pixel in operation 407. The image rendering apparatus may determine a pixel value of the pixel from an input image, and may assign the determined pixel value to the pixel.

Figure 5:
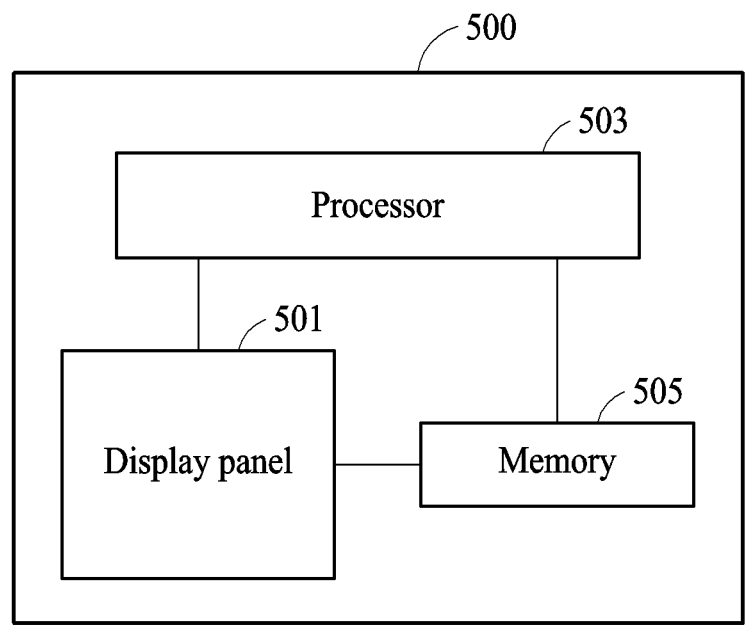
FIG. 5 is a diagram illustrating a configuration of an image rendering apparatus, according to an exemplary embodiment.

FIG. 5 is a diagram illustrating a configuration of an image rendering apparatus 500, according to an exemplary embodiment.

Referring to FIG. 5, the image rendering apparatus 500 includes a display panel 501, a processor 503 and a memory 505.

The display panel 501 may display a result image generated by the processor 503. The display panel 501 may display an image obtained by combining a 2D image with a 3D image as the result image. The display panel 501 may include a 2D display area that displays a 2D image, and a 3D display area that displays a 3D image. The 3D display area may include a 3D optical device configured to realize a stereoscopic effect of a 3D image by dividing the result image based on multiple viewpoints. The 3D optical device may include, for example, a parallax barrier and/or a lenticular lens.

The 2D display area and the 3D display area of the display panel 501 may be arranged using any of various schemes in any of various forms. For example, the 2D display area may surround the 3D display area, or may be located on one side or two sides of the 3D display area.

The processor 503 may control the image rendering apparatus 500, and may perform the operations described above with reference to FIGS. 12, 3, and 4. For example, the processor 503 may perform operations 201 through 211 of FIG. 2 and operations 401 through 407 of FIG. 4. The processor 503 may include, for example, a single processor, a multi-processor, a hardware accelerator (HWA), a graphics processing unit (GPU), or a combination thereof.

The processor 503 may perform one of a 2D rendering operation and a 3D rendering operation on each of a plurality of pixels that are to be output using the display panel 501, and may generate a result image in which the 2D image and the 3D image are combined. To this end, the processor 503 may determine which one of the 2D display area and the 3D display area includes each respective of the pixels, and may perform a 2D rendering operation or a 3D rendering operation at a position of a corresponding pixel based on a determination result. When a pixel is included in the 2D display area, a 2D rendering operation may be performed at a position of the pixel. When a pixel is included in the 3D display area, a 3D rendering operation may be performed at a position of the pixel.

The memory 505 may store viewpoint images (for example, a stereoscopic image of a left viewpoint image and a right viewpoint image), a 2D image, a panel image, instructions for an operation of the processor 503, various functions, an equation, and data such as an operation result. Further, the memory 505 may transmit corresponding data to the processor 503, or may transmit data stored in the memory 505 to the processor 503.

Figure 6A:
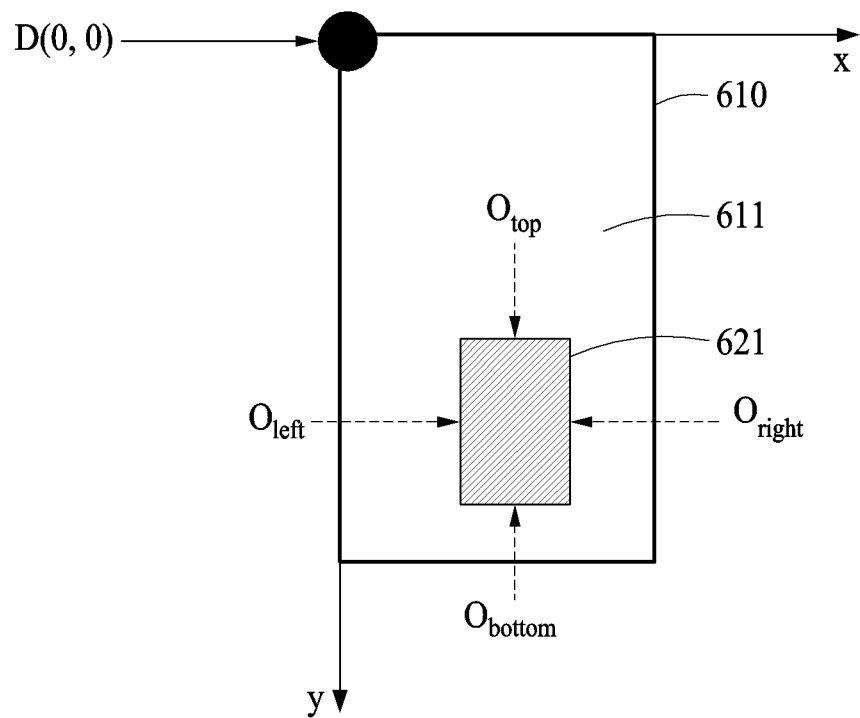
FIG. 6A is a diagram illustrating a process of performing a 2D rendering operation or a 3D rendering operation based on a position of a pixel, according to an exemplary embodiment.

FIG. 6A is a diagram illustrating a process of performing a 2D rendering operation or a 3D rendering operation based on a position of a pixel, according to an exemplary embodiment.

Referring to FIG. 6A, a display panel 610 may include a 2D display area 611 and a 3D display area 621, and each of the 2D display area 611 and the 3D display area 621 may include a plurality of pixels. The 3D display area 621 may be an area that includes a 3D optical device, and a location of the 3D display area 621 may be determined when a display device is produced.

As shown in FIG. 6A, the 3D display area 621 may be surrounded by the 2D display area 611. When the 3D display area 621 is assumed to have a rectangular shape, the 3D display area 621 may be defined based on $O_{left}$, $O_{right}$, $O_{top}$ and $O_{bottom}$, as described above. The location of the 3D display area 621 may be a location (x, y) that satisfies conditions of "$O_{left}<x<O_{right}$" and "$O_{bottom}<y<O_{top}$."

An image rendering apparatus may determine a type of rendering that is to be performed at a position of a pixel based on whether the pixel is included in a 3D display area. In an example, the image rendering apparatus may determine whether a corresponding pixel is located in the 3D display area 621, sequentially with respect to a pixel located at D(0, 0). When the corresponding pixel is determined to be in the 3D display area 621, the image rendering apparatus may perform a 3D rendering operation at a position of the pixel based on a plurality of viewpoint images. When the pixel is determined to be in the 2D display area 611, not the 3D display area 621, the image rendering apparatus may perform a 2D rendering operation at the position of the pixel. In another example, the image rendering apparatus may process, in parallel, the above operations with respect to each of the pixels.

Figure 6B:
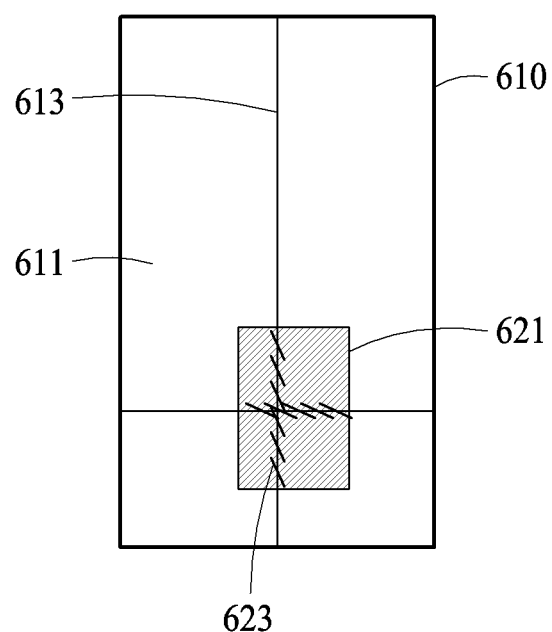
FIG. 6B is a diagram illustrating a method of distinguishing a 2D display area from a 3D display area, according to an exemplary embodiment.

FIG. 6B is a diagram illustrating a method of distinguishing a 2D display area from a 3D display area, according to an exemplary embodiment.

Referring to FIG. 6B, the image rendering apparatus may output a test image to distinguish the 2D display area 611 from the 3D display area 621. The test image may include two straight lines that intersect each other. The straight lines may be clearly displayed in the 2D display area 611. However, the straight lines may not be clearly displayed in the 3D display area 621 by a 3D optical device. A location and a size of the 3D display area 621 may be estimated based on a range within which the straight lines are not clearly displayed. For example, $O_{left}$, $O_{right}$, $O_{top}$ and $O_{bottom}$, which specify a boundary of the 3D display area 621, may be defined based on positions of portions of the straight lines that are not clearly displayed.

Figure 7A:
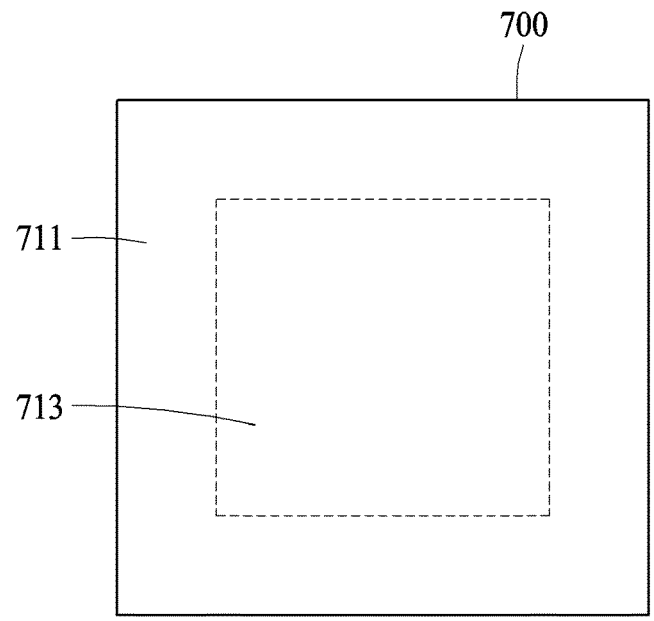
FIGS. 7A, 7B, and 7C are diagrams illustrating examples of structures in which a 2D display area and a 3D display area are arranged, according to an exemplary embodiment.
Figure 7B:
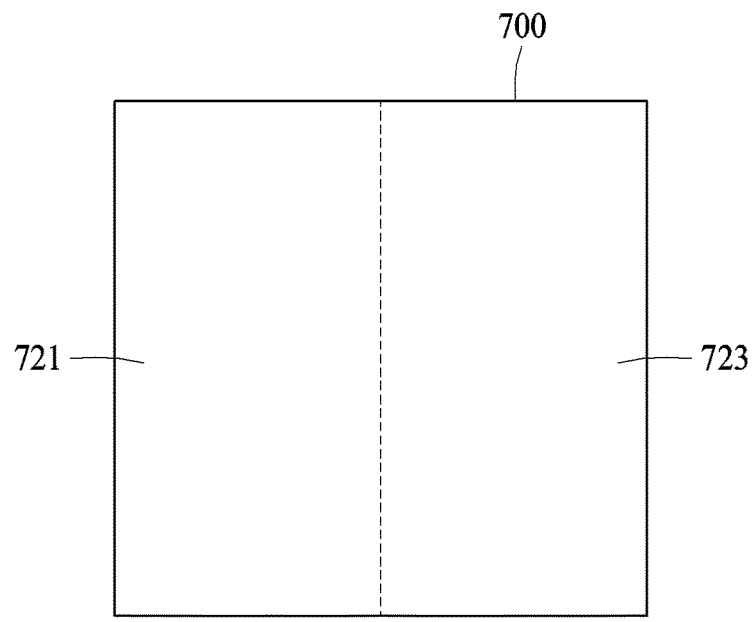
Figure 7C:
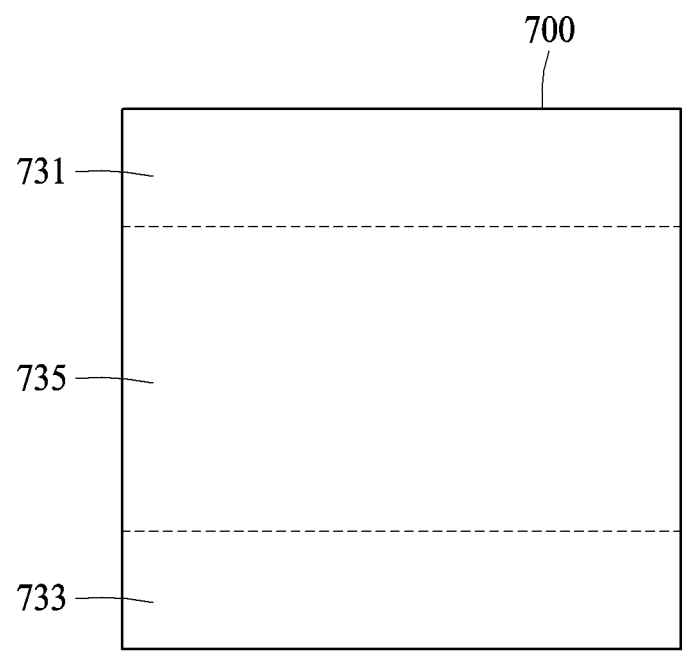

FIGS. 7A, 7B, and 7C are diagrams illustrating examples of structures in which a 2D display area and a 3D display area are arranged, according to an exemplary embodiment.

A display panel 700 may include both a 2D display area and a 3D display area, and the 2D display area and the 3D display area may be arranged in any of various forms, as shown in FIGS. 7A, 7B, and 7C. Arrangement forms of FIGS. 7A, 7B, and 7C are merely examples, and an arrangement scheme is not limited to thereto.

As shown in FIG. 7A, a 2D display area 711 may surround a 3D display area 713. As shown in FIG. 7B, a 2D display area 721 may be located on a side of a 3D display area 723. As shown in FIG. 7C, a display panel 700 may include a plurality of 2D display areas, for example, 2D display areas 731 and 733. The 2D display areas 731 and 733 may be located on a side and another side (i.e., two sides) of a 3D display area 735.

Figure 8A:
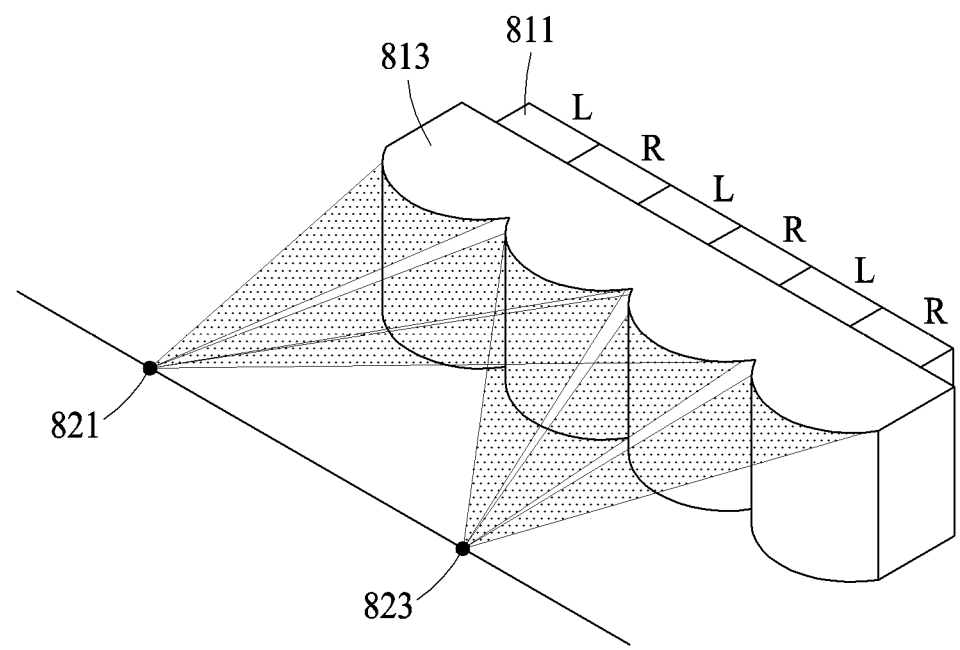
FIGS. 8A and 8B are diagrams illustrating examples of a display panel that includes a lenticular lens and/or a parallax barrier, according to an exemplary embodiment.
Figure 8B:
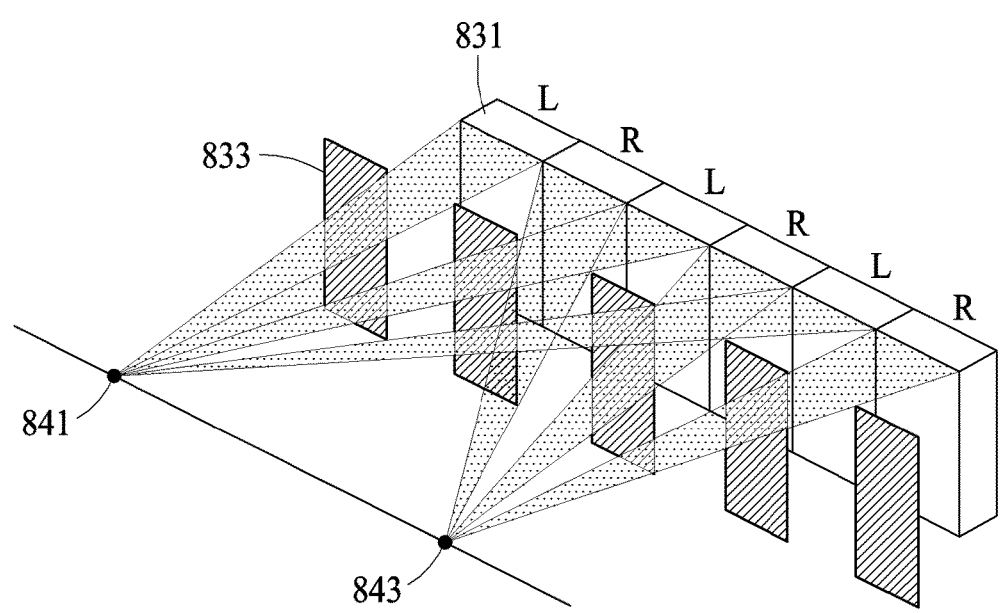

FIGS. 8A and 8B are diagrams illustrating examples of a display panel that includes a lenticular lens and/or a parallax barrier, according to an exemplary embodiment.

For example, an image rendering apparatus may implement a 3D image based on an autostereoscopic 3D display scheme. The image rendering apparatus may enable different images to be shown to a left eye and a right eye of a user using a 3D optical device, for example, a parallax barrier and/or a lenticular lens, to provide a stereoscopic effect to the user. The 3D optical device may be located on or above a portion of a display panel that corresponds to a 3D display area.

FIG. 8A illustrates a display panel that includes a lenticular lens 813. Referring to FIG. 8A, in a scheme of using the lenticular lens 813, a plurality of cylindrical lenses with a relatively small pitch may be arranged in front of the display panel, and a left viewpoint image and a right viewpoint image may be isolated from each other. The lenticular lens 813 may be located in front of pixels 811, as shown in FIG. 8A. The pixels 811 may be classified as a pixel L that corresponds to a left viewpoint image and a pixel R that corresponds to a right viewpoint image. A plurality of viewing zones, for example, viewing zones 821 and 823, may be formed. The viewing zones 821 and 823 may be areas in which images are viewed separately from each other based on a viewpoint direction by the lenticular lens 813.

FIG. 8B illustrates a display panel that includes a parallax barrier 833. Referring to FIG. 8B, in a scheme of using the parallax barrier 833, barriers to limit a light projection direction may be located in front of the display panel, and a left viewpoint image and a right viewpoint image may be isolated from each other. The barriers may be located in front of pixels 831 as shown in FIG. 8B, or located behind the pixels 831. Similarly to a lenticular lens, a plurality of viewing zones, for example, viewing zones 841 and 843, may be formed by the parallax barrier 833.

The exemplary embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as a parallel processor configuration.

The software may include a computer program, a piece of code, an instruction, or some combination thereof, to independently or collectively instruct or configure the processing device to operate as desired. Software and data may be implemented permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as compact disc-read-only memory (CD ROM) discs and digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

While the present disclosure includes exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each exemplary embodiment are to be considered as being applicable to similar features or aspects in other exemplary embodiments. Suitable results may be achieved if the described techniques are performed in a different order, and/or if components in a described system, architecture, device, or circuit are combined in a different manner and/or replaced or supplemented by other components or their equivalents. Therefore, the scope of the present disclosure is defined not by the detailed description, but by the claims and their equivalents, and all variations within the scope of the claims and their equivalents are to be construed as being included in the present disclosure.

What is claimed is:

1. A method of rendering an image to be displayed on a display device including a display panel, the method comprising:
    determining which one from among a two-dimensional (2D) display area and a three-dimensional (3D) display area includes a current pixel, the 2D display area displaying a 2D image and the 3D display area displaying a 3D image, wherein a 3D optical device is located on or above the 3D display area of the display panel and determine a ray direction of the 3D image;
    performing a 2D rendering operation at a position of the current pixel when the current pixel is included in the 2D display area not corresponding to the 3D optical device; and
    performing a 3D rendering operation at a position of the current pixel when the current pixel is included in the 3D display area corresponding to the 3D optical device.

2. The method of claim 1, wherein each of the 2D display area and the 3D display area is included in a single screen.

3. The method of claim 2, wherein the 2D display area surrounds the 3D display area.

4. The method of claim 1, further comprising:
    performing the 2D rendering operation or the 3D rendering operation on each of a plurality of pixels, and generating a result image in which the 2D image is combined with the 3D image.

5. The method of claim 1, wherein the 2D display area displays at least one from among text and a guidance indication.

6. The method of claim 5, wherein the 2D display area displays the at least one from among the text and the guidance indication to provide operating information that relates to a vehicle.

7. The method of claim 1, wherein the 3D display area displays an image of a 3D object.

8. The method of claim 7, wherein the 3D display area displays the image of the 3D object to guide a traveling path of a vehicle.

9. The method of claim 7, wherein a plurality of viewing zones to display the image of the 3D object are generated in the 3D display area by using at least one from among a parallax barrier and a lenticular lens.

10. The method of claim 1, wherein the display device is a head-up display (HUD) device.

11. A non-transitory computer-readable storage medium storing instructions that, when executed by a processor, cause the processor to perform the method of claim 1.

12. An image rendering apparatus comprising:
    at least one processor;
    a display panel comprising a two-dimensional (2D) display area that displays a 2D image and a three-dimensional (3D) display area that displays a 3D image; and
    a 3D optical device that is located on or above the 3D display area of the display panel and determine a ray direction of the 3D image,
    wherein the processor is configured to perform at least one from among a 2D rendering operation and a 3D rendering operation on each of a plurality of pixels that are to be output using the display panel, to perform 3D rendering operation on the 3D display area corresponding to the 3D optical device, to perform 2D rendering operation on the 2D display area not corresponding to the 3D optical device, and to generate a result image in which the 2D image is combined with the 3D image, and
    the display panel is configured to display the result image.

13. The image rendering apparatus of claim 12, wherein the processor is further configured to:
    determine which one from among the 2D display area and the 3D display area includes a current pixel;
    perform the 2D rendering operation at a position of the current pixel when the current pixel is included in the 2D display area; and
    perform the 3D rendering operation at a position of the current pixel when the current pixel is included in the 3D display area.

14. The image rendering apparatus of claim 12, wherein the display panel comprises at least one from among a parallax barrier and a lenticular lens that is configured to generate a plurality of viewing zones to display the 3D image.

15. The image rendering apparatus of claim 14, wherein the at least one from among the parallax barrier and the lenticular lens is located on or above a portion of the display panel that corresponds to the 3D display area.

16. The image rendering apparatus of claim 12, wherein the 2D display area surrounds the 3D display area.

17. The image rendering apparatus of claim 12, wherein the 2D display area is located on a side of the 3D display area.

18. The image rendering apparatus of claim 12, wherein
the display panel comprises a plurality of 2D display areas, and
each of the plurality of 2D display areas is located at one from among a first side and a second side of the 3D display area.

19. The image rendering apparatus of claim 12, wherein
the 2D display area displays at least one from among a text and a guidance indication to provide operating information that relates to a vehicle, and
the 3D display area displays an image of a 3D object to guide a traveling path of the vehicle.

20. A method of rendering a composite image to be displayed on a display panel of a display device, the display panel being divided into a two-dimensional (2D) display area that includes a plurality of first pixels and a three-dimensional (3D) display area that includes a plurality of second pixels, and the method comprising:
for each first pixel from among the plurality of first pixels, performing a 2D rendering operation on the 2D display area not corresponding to a 3D optical device;
for each second pixel from among the plurality of second pixels, tracking a right eye position and a left eye position of a viewer, and performing a 3D rendering operation based on each of the tracked right eye position and the tracked left eye position on the 3D display area corresponding to the 3D optical device; and
generating the composite image that includes a combination of a 2D image located in the 2D display area and a 3D image located in the 3D display area as a result of the performing all of the 2D rendering operations and the performing all of the 3D rendering operations,
wherein the 3D optical device is located on or above the 3D display area of the display panel and determine a ray direction of the 3D image.

* * * * *